United States Patent
Hochrein et al.

(10) Patent No.: US 6,499,507 B1
(45) Date of Patent: Dec. 31, 2002

(54) ROTARY VALVE

(75) Inventors: Bradley George Hochrein, Dexter, MI (US); Timothy Gerard Offerle, Whittaker, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/659,950

(22) Filed: Sep. 12, 2000

(51) Int. Cl.$^7$ ............................................... B62D 5/083
(52) U.S. Cl. .................. 137/625.22; 91/375 R
(58) Field of Search ............... 137/625.21, 625.22, 137/625.23; 91/375 A, 375 R

(56) References Cited

U.S. PATENT DOCUMENTS

| | | |
|---|---|---|
| 3,591,136 A | 7/1971 | Bishop |
| 4,452,274 A * | 6/1984 | Haga et al. ............ 137/625.22 |
| 4,561,516 A | 12/1985 | Bishop et al. |
| 4,765,369 A | 8/1988 | Bacardit |
| 4,924,910 A | 5/1990 | Tabata |
| 5,133,384 A | 7/1992 | Tabata |
| 5,267,588 A | 12/1993 | Bishop et al. |
| 5,794,507 A * | 8/1998 | Strong ....................... 91/375 A |
| 5,799,693 A * | 9/1998 | Strong .................... 137/625.23 |
| 6,240,961 B1 * | 6/2001 | Strong .................... 137/625.23 |

OTHER PUBLICATIONS

Andrew Thomas, Development of the Bishop ATS Rotary Valve, Steering and Suspensions Technology (SP–1223), Feb. 24–27–1997, pp. 215–224, United States.

* cited by examiner

Primary Examiner—John Rivell
(74) Attorney, Agent, or Firm—Gregory P. Brown

(57) ABSTRACT

A rotary valve 10 which includes a first sleeve member 24 and a second shaft member 32. The members 24 and 32 cooperatively provide pressure to a cylinder assembly 36, effective to cause the cylinder assembly 36 to move the wheels 20, 22 in a desired direction. The valve 10 provides increased pressure to the low-pressure side of the piston as the amount of torque which is communicated to it is increased or as the velocity of the rack assembly 18 is increased from wheels 20, 22.

8 Claims, 2 Drawing Sheets

ROTARY VALVE

FIELD OF THE INVENTION

The present invention generally relates to a rotary valve and more particularly, to a rotary valve which selectively provides fluid to a cylinder assembly, effective to allow a vehicle or other apparatus to be easily turned and maneuvered.

BACKGROUND OF THE INVENTION

A rotary valve is used to selectively communicate fluid and pressure to a cylinder assembly in response to the receipt of torque from a steering wheel or shaft, effective to allow for relatively easy steering and/or maneuvering of a vehicle. One type of such a rotary valve is referred to as a "Bishop" valve which is described, by way of example and without limitation, in the publication entitled *Development of the Bishop ATS Rotary Valve* which is authored by Mr. Andrew Thomas, which is published by the Society of Automotive Engineers, which may be referenced by Library of Congress Number ISSN0148-7191, and which is fully and completely incorporated herein by reference, word for word and paragraph for paragraph.

Particularly, such a rotary valve a sleeve member which journals on an input shaft member. Each member typically and respectively has axially extending blind ended slots which cooperatively form throttling orifices which deliver fluid and concomitantly created pressure to one of two opposed ends of a cylinder assembly, thereby causing the cylinder assembly to assist in the turning and maneuvering of the vehicle.

While the rotary valve does allow for the selective communication of fluid and pressure to the cylinder assembly, it may suffer from some disadvantages. For example and without limitation, the use of the previously delineated orifices may cause the valve to resonant or "vibrate", thereby imparting undesired vibrations to the steering wheel and to the vehicle driver. Moreover, the orifices also cause cavitation and other forms of noise which may be undesirably communicated into the vehicular passenger compartment.

It may therefore be desirable to provide a rotary valve which overcomes some or all of the previously delineated drawbacks of prior rotary valves and which concomitantly allows a vehicle to be easily steered and maneuvered.

SUMMARY OF THE INVENTION

It is a first object of the present invention to provide a rotary valve which overcomes some or all of the previously delineated drawbacks of prior rotary valves and which, by way of example and without limitation, concomitantly allows a vehicle to be easily steered and maneuvered.

It is a second object of the present invention to provide a rotary valve which overcomes some or all of the previously delineated drawbacks of prior valves and which, by way of example and without limitation, operates in a substantially quiet manner.

It is a third object of the present invention to provide a rotary valve which overcomes some or all of the previously delineated drawbacks of prior valve assemblies and which, by way of example and without limitation, substantially prevents resonance from occurring and/or reduces the likelihood of resonance from occurring during the operation of the valve.

According to a first aspect of the present invention, a rotary valve is provided and includes a first port which receives fluid from a source and a second port which receives the fluid and which communicates the fluid to the source, the second port being substantially identical to the first port.

According to a second aspect of the present invention, a rotary valve is provided which receives torque and which provides a certain pressure which increases in accordance with an increase of the supplied torque.

According to a third aspect of the present invention, a method is provided for reducing the likelihood of resonance from occurring in a rotary valve of the type having at least an inlet port through which fluid is communicated and an outlet port through which the fluid exits the valve, the method including the step of constricting the outlet port.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
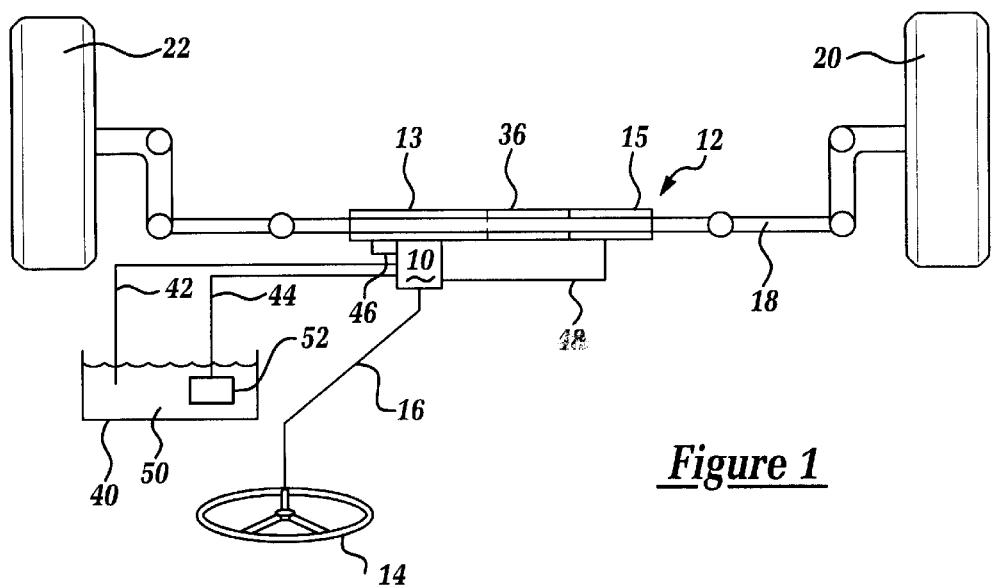
FIG. 1 is a block diagram of a rotary valve which is made in accordance with the teachings of the preferred embodiment of the invention and which is shown as being operatively deployed within a steering assembly of a vehicle.
Figure 2:
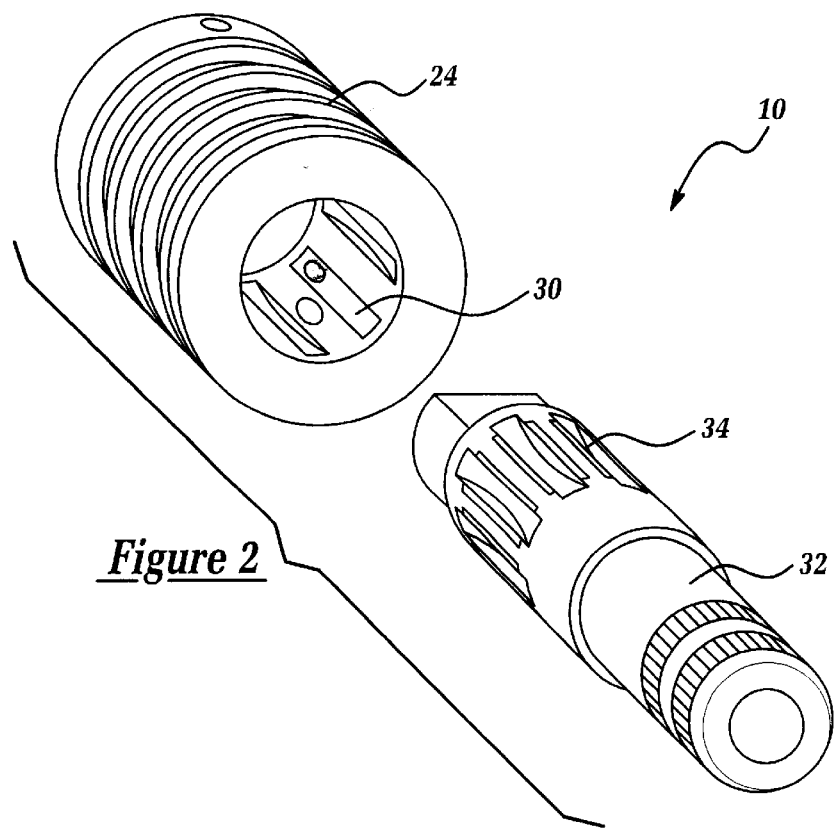
FIG. 2 is an unassembled perspective view of a portion of the valve assembly which is shown in FIG. 1.

Referring now to FIG. 1, there is shown a rotary valve 10 which is made in accordance with the teachings of the preferred embodiment of the invention and which is operably deployed within and/or upon a typical steering assembly 12 of a vehicle.

Particularly, steering assembly 12 includes a steering wheel member 14 which is disposed upon a steering column member 16 and which is adapted to be held in the hands of a driver and selectively turned, effective to allow the driver to selectively turn and/or maneuver the vehicle in which the steering assembly 12 is disposed. The steering assembly 12 further includes a rack assembly 18 which is physically coupled to a pair of wheels 20, 22 and which typically moves in response to movement of the member 16, thereby causing the wheels 20, 22 to be moved and causing the vehicle to be maneuvered. In one non-limiting embodiment of the invention, member 16 may be physically coupled to the rack assembly, effective to directly transfer torque from the wheel 14 to the assembly 18, thereby allowing the wheels 20, 22 to be turned in the direction of the turning of the wheel 14.

In the preferred embodiment of the invention, as best shown in FIGS. 1–4, rotary valve 10 includes a generally cylindrical sleeve member 24 having a series or several (e.g., in the preferred embodiment of the invention, about eight) axially extending blind ended slots 30 and a generally cylindrical input shaft member 32 which similarly has a series of or several axially extending blind ended slots 34 (e.g., in the preferred embodiment of the invention about eight such slots). The sleeve member 24 journals on the member 32. Moreover, in one non-limiting embodiment, member 32 may be integrally formed with the member 16 or connected to the member 16 by conventional fasteners or attachment members. In yet a further non-limiting embodiment of the invention, member 16 may be directly coupled to assembly 18 and to valve 10 and, in this embodiment, valve 10, in cooperation with cylinder assembly 36, assists the turning of the wheels 20, 22 in a manner which is more fully set forth below.

Rotary valve 10 is physically and communicatively coupled to a source 40 of fluid 50 by use of conduits 42, 44 and is further respectively, physically, and communicatively coupled to opposed ends 13, 15 of a cylinder assembly 36 by the use of respective conduits 46 and 48. The cylinder assembly 36 is physically and movably coupled to the rack member 18 in a known and conventional manner. Further, source 40 has a pump 52 which provides fluid 50 to the valve 10 in a substantially continuous manner by the use of conduit 44.

In operation, as the wheel member 14 is turned, torque is produced by the member 16, thereby causing the movement of member 32 relative to member 24. The motion of the member 16 causes the slots 30 and 34 to change their relative orientation from their orientation which exists when the member 16 is at "rest" (e.g., during non-movement of the steering wheel 14 or an initial "unturned" position). Such torque causes fluid 50 and concomitant pressure to be applied to one "side" or one of the opposed ends 13, 15 of the cylinder assembly 36 (e.g., the received fluid 50 exits the valve 10 through one of the two output conduits 46, 48), thereby allowing the cylinder assembly 36 to assist in the turning of the wheels 20, 22 in a direction opposite to the direction or the end or "side" 13, 15 of the cylinder assembly 36 to which the pressure or the fluid 50 has been applied. The fluid 50 is returned to the valve and returned to the supply 40, by use of conduit 42, as the steering wheel member 14 is moved to its initial position.

Figure 3:
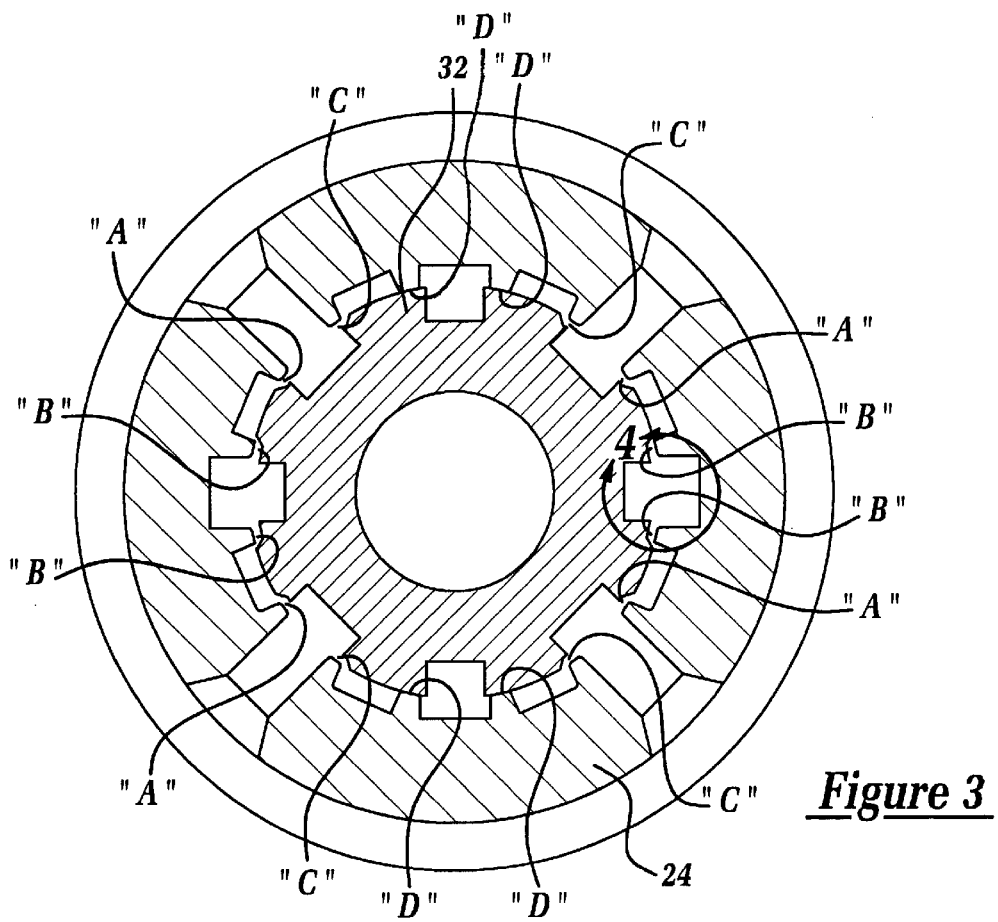
FIG. 3 is a sectional view of the rotary valve which is shown in FIGS. 1 and 2.
Figure 4:
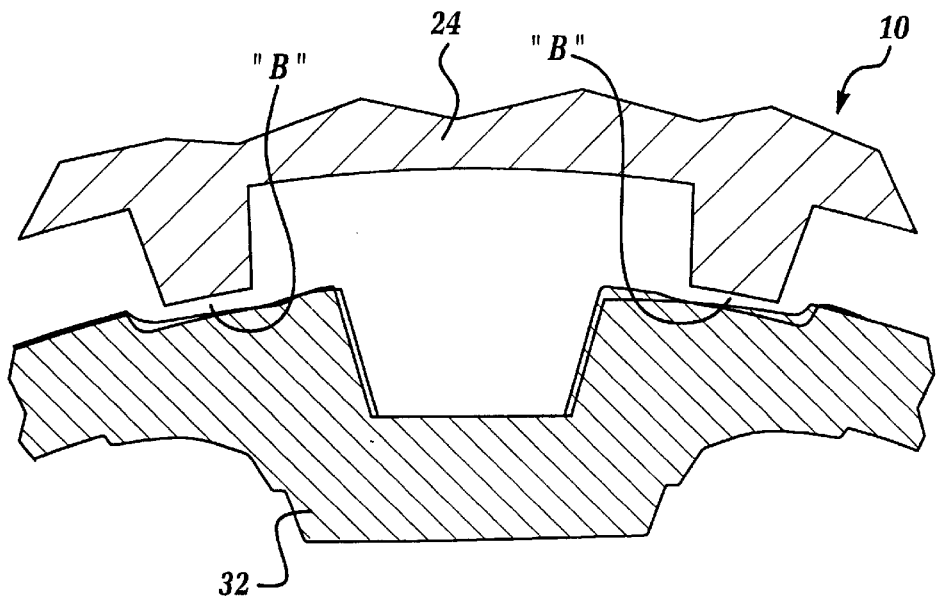
FIG. 4 is an exploded sectional view of a portion of the rotary valve which is shown in FIG. 3 and which is taken along view line 4—4.

There exists, in conventional rotary valves, such as rotary valve 10, four types of "edges" or ports which are conventionally denoted as "A", "B", "C", and "D". More particularly, a conventional rotary valve typically has four of each type of edge and each edge "A"–"D" comprises or forms an orifice (e.g., the orifices are formed by the cooperative assembly of member 30 and 32). The edges and/or orifices "A", "C", and "D" are used in the rotary valve 10 of the preferred embodiment of the invention, as best shown in FIGS. 3 and 4, and are substantially similar to the respectively conventional edges or orifices "A", "C", and "D". Moreover, each edge or orifice which is of the "B" type is used to communicate fluid 50 from the valve 10 to the fluid supply 40 by use of conduit 44 and each edge or orifice of the "D" type is used to allow fluid 50 to enter valve 10 by use of conduit 42. In contrast to a typical rotary valve, each edge or orifice of the type "B", in the preferred embodiment of the invention, is modified (relative to the conventional edge "B" design) to be "greatly constricted" as the differential or relative angle between the input shaft member 32 and the sleeve member 24 is increased. Hence, each edge or orifice of the type of "B" is similar in shape, in one non-limiting embodiment of the invention, to the type of edge or orifice which is conventionally denoted as type "D", thereby causing an increase in pressure on the "low-pressure side" (e.g., on the end 13, 15 which does not receive the fluid 50) of the cylinder assembly 36 as the amount of torque generated by the rotation or movement of member 16 is increased. Moreover, it should be realized that the amount of generated pressure, on the low pressure side or end of the cylinder assembly 36, is also a function of the velocity of the rack assembly 18 and an increase in the velocity of the rack assembly 18 increases the created pressure, thereby causing increased damping and reduced noise. The modification of each edge or orifice of the type "B", in this manner, provides these benefits without requiring relatively complicated and expensive modification to the member 30 (e.g., only the configuration of member 32 requires alteration). Hence, the cross sectional area (e.g., shown in FIG. 3) of all type "B" edges or orifices is equal to (or less than) the cross sectional area of each of the type "D" edges or orifices. In another non-limiting embodiment, the cross sectional area of each of the type "B" orifices may vary from about ten percent (10%) of the cross sectional area of a conventional type "D" orifice or edge to about one hundred percent (100%) of the cross sectional area of a conventional type "D" orifice or edge, thereby always ensuring that the orifice created by the utilized or "modified" edge "B" is smaller than the orifice created by and/or represented by the conventional edge "B" (e.g., the cross sectional area of the utilized type "B" edge or orifice is less than the cross sectional area of the conventional type "B" edge or orifice). In this manner, the type "B" edges or orifices may have a selectable cross sectional area which may be "tunable" to a specific type of steering assembly or condition.

It is to be understood that the invention is not limited to the exact construction and method which has been previously delineated, but that various changes and modifications may be made without departing from the spirit and the scope of the invention as is more fully delineated in the following claims.

What is claimed is:

1. A rotary valve comprising:
   a sleeve member having a first plurality of slots; and
   an input shaft having a second plurality of slots which cooperate with said first plurality of slots to form a first plurality of upflow ports and a second plurality of downflow ports having a sharp edged entry and a tapered exit, wherein at least one of said first upflow ports have a sharp edged entry and a tapered exit similar in shape to said downflow ports, wherein said first upflow ports receive fluid from a source and said second downflow ports receive said fluid and selectively communicate said fluid to said source.

2. The rotary valve of claim 1 wherein said plurality of downflow ports have a certain cross sectional area and wherein said at least one of said upflow ports having a sharp edged entry and tapered exit have a cross sectional area which is smaller than the cross sectional area provided by said plurality of downflow ports.

3. The rotary valve of claim 1 wherein said first plurality of slots is equal to said second plurality of slots.

4. The rotary valve of claim 3 wherein said input member is integrally formed upon a steering shaft.

5. The rotary valve of claim 4 wherein said first plurality of slots is equal to about eight.

6. A rotary valve having substantially similar inlet and outlet ports, said rotary valve receiving torque and providing a certain pressure to a low pressure side of a cylinder assembly, said provided pressure increasing in accordance with an increase of said received torque, said rotary valve comprising:
   a sleeve member having eight slots; and
   an input member having eight slots which cooperate with said eight sleeve member slots to form eight of said inlet ports and eight of said outlet ports, wherein said outlet ports have a sharp edged entry and a tapered exit;

wherein at least four of said inlet ports have sharp edged entries and tapered exits thereby providing said certain pressure to said low pressure side of said cylinder assembly.

7. The rotary of claim 6 wherein said input member is integrally formed upon a steering shaft.

8. A method of reducing the likelihood of resonance in a rotary valve of the type having at least one inlet port through which fluid is received and an outlet port through which said fluid exits said rotary valve, said method comprising the steps of:

forming a plurality of downflow edges within said rotary valve having sharp edged entries and tapered exits;

forming a plurality of upflow edges within said rotary valve having tapered entries and sharp edged exits; and forming a plurality of upflow edges within said rotary valve having sharp edged entries and tapered exits which are similar in shape to said downflow edges.

* * * * *